(12) United States Patent
Andreu

(10) Patent No.: US 9,699,169 B2
(45) Date of Patent: Jul. 4, 2017

(54) COMPUTER READABLE STORAGE MEDIA FOR SELECTIVE PROXIFICATION OF APPLICATIONS AND METHOD AND SYSTEMS UTILIZING SAME

(71) Applicant: Symantec Corporation, Mountain View, CA (US)

(72) Inventor: Roger Casals Andreu, Los Gatos, CA (US)

(73) Assignee: Symantec Corporation, Mountain View, CA (US)

( * ) Notice: Subject to any disclaimer, the term of this patent is extended or adjusted under 35 U.S.C. 154(b) by 92 days.

(21) Appl. No.: 13/827,467

(22) Filed: Mar. 14, 2013

(65) Prior Publication Data

US 2013/0305338 A1 Nov. 14, 2013

Related U.S. Application Data

(60) Provisional application No. 61/645,598, filed on May 10, 2012.

(51) Int. Cl.
*G06F 21/41* (2013.01)
*H04L 29/06* (2006.01)
*H04L 9/32* (2006.01)

(52) U.S. Cl.
CPC ...... *H04L 63/0815* (2013.01); *H04L 63/0281* (2013.01)

(58) Field of Classification Search
CPC ... H04L 63/0281; H04L 67/28; H04L 9/0844; H04L 63/0884; H04L 2209/76
See application file for complete search history.

(56) References Cited

U.S. PATENT DOCUMENTS 6,751,677 B1 * 6/2004 Ilnicki ...................... H04L 63/08
707/999.103
7,653,722 B1 * 1/2010 Krishna ............ G06F 17/30902
709/224

(Continued)

FOREIGN PATENT DOCUMENTS

EP 2400716 A2 12/2011
WO 03017619 2/2003

(Continued)

OTHER PUBLICATIONS

Web MIXes: A System for Anonymous and Unobervable Internet Access. Berthold et al. LNCS(2009).*

(Continued)

*Primary Examiner* — Venkat Perungavoor
(74) *Attorney, Agent, or Firm* — Wilmer Cutler Pickering Hale and Dorr LLP

(57) ABSTRACT

Systems and methods for selective proxification of applications are disclosed. One or more computer readable storage media may be encoded with instructions executable by one or more processing units of a computing system. The instructions encoded on the computer readable storage media may comprise authenticating a single sign-on access at a proxy server, receiving a request at the proxy server to access an application on an application server requiring authentication, accessing the application on the application server, authenticating a user to the application without additional authentication input from the user, and selectively providing a proxified session between the user and the application.

14 Claims, 4 Drawing Sheets

(56) References Cited

U.S. PATENT DOCUMENTS

| | | | |
|---|---|---|---|
| 9,130,935 B2* | 9/2015 | Somani | H04L 63/0815 |
| 9,338,165 B2* | 5/2016 | Simpkins | H04L 63/08 |
| 2002/0065946 A1* | 5/2002 | Narayan | G06F 9/548 |
| | | | 719/315 |
| 2004/0044909 A1* | 3/2004 | Mirza | H04L 63/0281 |
| | | | 726/27 |
| 2006/0005237 A1* | 1/2006 | Kobata | H04L 63/0823 |
| | | | 726/12 |
| 2007/0150610 A1* | 6/2007 | Vassilev | H04L 63/08 |
| | | | 709/230 |
| 2007/0283421 A1 | 12/2007 | Hirose | |
| 2008/0077789 A1* | 3/2008 | Gondo | H04L 63/08 |
| | | | 713/155 |
| 2009/0037991 A1* | 2/2009 | Ellis | G06F 17/3089 |
| | | | 726/6 |
| 2009/0193129 A1* | 7/2009 | Agarwal et al. | 709/229 |
| 2010/0281530 A1* | 11/2010 | Tarkoma | 726/9 |
| 2012/0278872 A1* | 11/2012 | Woelfel et al. | 726/7 |
| 2012/0284786 A1* | 11/2012 | Somani | H04L 63/0815 |
| | | | 726/7 |

FOREIGN PATENT DOCUMENTS

| | | |
|---|---|---|
| WO | WO 2008024454 A1 * | 2/2008 |
| WO | 2013170158 | 11/2013 |

OTHER PUBLICATIONS

Impostor: A Single Sign-On System for USe from Untrusted Devices. Pashalidis et al. IEEE(2004).*
An Online Credential Repository for the Grid:MyPRoxy. Novotny et al. IEEE(2001).*
JP2011251297A. English translation. 2001.*
International Search Report for PCT/US2013/040564, mailed Nov. 14, 2013.
Written Opinion for PCT/US2013/040564, mailed Nov. 10. 2014.
International Preliminary Report on Patentability for PCT/US2013/040564, mailed Nov. 11, 2014.

* cited by examiner

COMPUTER READABLE STORAGE MEDIA FOR SELECTIVE PROXIFICATION OF APPLICATIONS AND METHOD AND SYSTEMS UTILIZING SAME

CROSS REFERENCE WITH RELATED APPLICATIONS

This application claims priority to U.S. Provisional Application No. 61/645,598, filed May 10, 2012, which application is incorporated herein by reference in its entirety for any purpose.

TECHNICAL FIELD

Described embodiments of the present invention relate to use of applications in an Internet protocol (IP) network, and more specifically to the selective proxification of applications in an IP network.

BACKGROUND OF THE INVENTION

Organizations often require access control and/or authentication for access to applications, and sometimes use one or more of a multitude of security mechanisms, such as firewalls, to achieve this. Unfortunately, remote user access, particularly with respect to cloud-based applications, can create uncertainty for organizations as to whether users are accessing applications through such security mechanisms.

To prevent users from bypassing security measures when accessing applications directly, organizations often do not share user credentials for authentication, but instead provide users with access to applications in other ways, such as through virtual private networks (VPNs) or Proxy servers (cloud or on-premise). While these methods may provide a greater degree of control, they can also be cumbersome for implementation and result in high bandwidth consumption. Network activity of remote users for example must be routed both in and out of the network for accesses to remote applications, services, and/or resources. Consequently, organizations utilizing VPNs or regular proxies often are forced to either settle for compromised network efficiency or invest in higher capacity network infrastructure.

DETAILED DESCRIPTION

Figure 1:
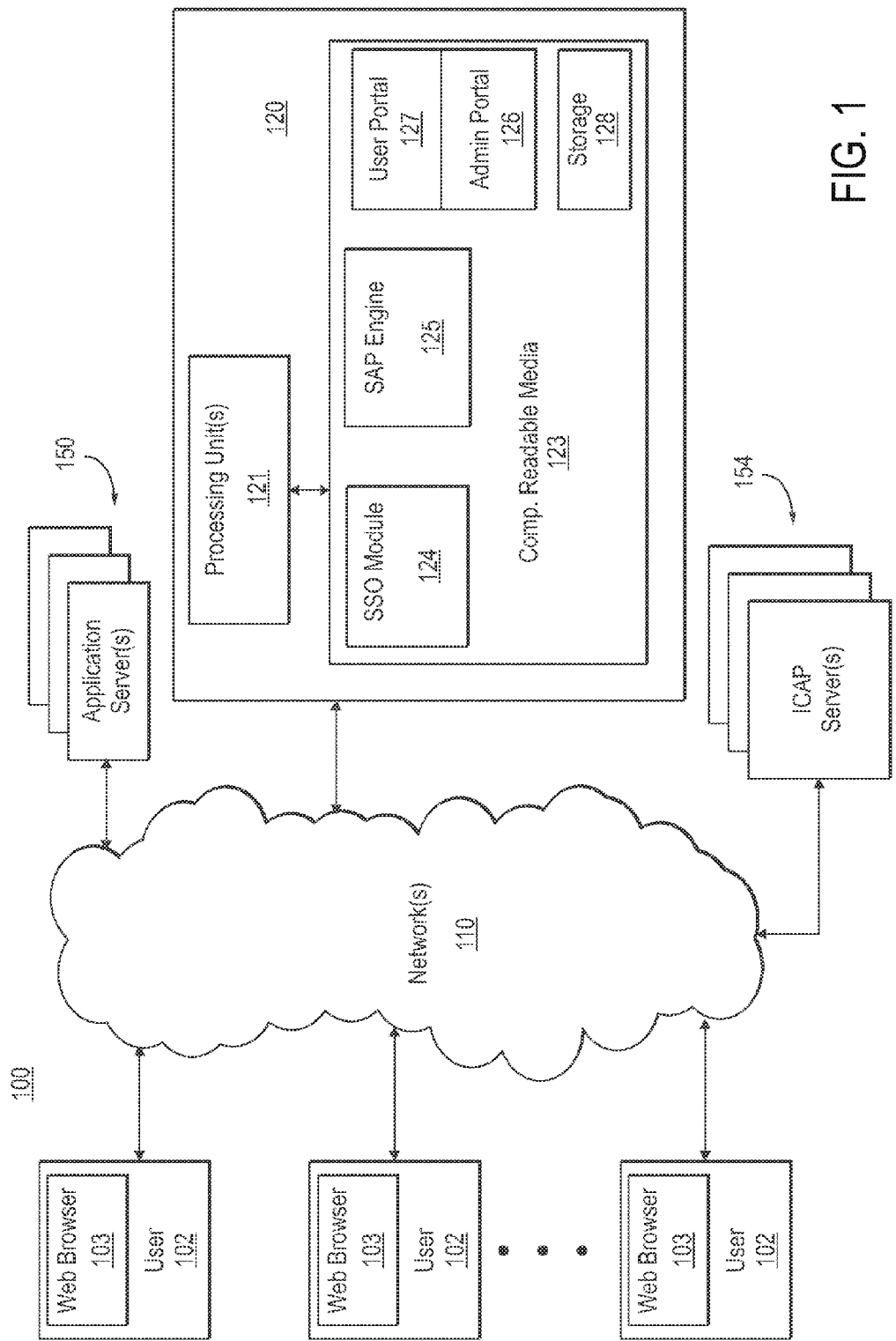
FIG. 1 illustrates a schematic diagram of a computer network system in accordance with an embodiment of the invention.

Systems and methods for selective proxification of applications are disclosed. In accordance with one or more embodiments of the present invention, users may be selectively provided with access to one or more applications through proxified sessions and/or non-proxified sessions. Certain details are set forth below to provide a sufficient understanding of embodiments of the invention. However, it will be clear to one skilled in the art that embodiments of the invention may be practiced without various aspects of these particular details. In some instances, well-known network components, communication protocols, authentication protocols, and software operations have not been shown in detail in order to avoid unnecessarily obscuring the described embodiments of the invention.

Embodiments of the present invention relate to Single Sign-On (SSO) authentication methodologies. SSO authentication includes mechanisms where, in response to a single authentication of a user, the user may be authenticated with respect to a plurality of applications or services. Typically, permission levels for each of the respective applications may be individually determined based on the identity of the user, and in most cases, a user may be SSO authenticated after providing a SSO server with valid user credentials, such as for example any combination of a valid user name, a password and an identification number of the user's computing device. After a successful authentication, a user may access any of a number of predetermined or other applications as if the user had been authenticated with each application individually. More specifically, once a user has authenticated with a SSO server, the SSO server may authenticate with one or more applications on behalf of the user, for example using credentials assigned to the user and specifically corresponding to each respective application. The server may authenticate on behalf of the user by authenticating with an application using one of a plurality of sets of user credentials, each of which set can related to one or more applications to which the user has been pre-enrolled. Thus, by completing a SSO authentication with the SSO server, the user may access any of the aforementioned applications without further authentication. Use of SSO authentication may reduce the need for a user to remember or store a multitude of passwords for applications, improve efficiency at an enterprise level by simplifying account management, and/or increase protection of user credentials by reducing the misappropriation of credentials, for instance, through phishing. More recently, SSO authentication has been applied to cloud computing environments, allowing users to access web-based applications. Accordingly, users may use SSO authentication to access applications not only at an enterprise level, but on remote and/or third-party servers as well.

Embodiments of the present invention further relate to proxies, such as forward proxies, reverse proxies, and web proxies. As known, proxies may serve as intermediaries between a user and a destination or application server and may operate at network and/or application levels of network communication. In this manner, "proxification," which may also be referred to as "proxyfication," of communication between the user and the destination server may be used to create a "proxified session" in which the user may seamlessly communicate with an application or service on the destination server while all network activity between the user and application is routed through the proxy server and/or proxy. Because all network activity is routed in this manner, permissions, bandwidth, and content of the session may all be controlled and/or scrutinized. For example, a user may be permitted to download only particular files or access only particular information with respect to applications on the destination or application server. Alternatively, or additionally, a user may have restricted access based on other factors, such as the time of day, day of the week, IP address, and/or type of device used to access the destination server.

A forward proxy is an intermediary system that provides a local user, such as a user within a VPN, access to one or more remote servers, which can include destination and application servers, by means of or through a proxy server. Often this access is based on a permission level assigned to the forward proxy, particularly in enterprise networks. Forward proxies may also be referred to as client caches, as a forward proxy may cache data from the one or more remote destination or application servers on the proxy server, providing more efficient access to the data that would otherwise be acquired from the one or more remote servers. Similarly, a reverse proxy is an intermediary system that may provide data between a user and other servers or systems, which can include destination and application servers. In contrast to a forward proxy, a reverse proxy is normally located on the destination server-side of a network. Thus, a reverse proxy may provide a user with access to servers in a private network. From the perspective of the user, data received from the destination server appears to originate from the reverse proxy. Similar to the forward proxy, reverse proxy servers may cache backend data from the destination server on the proxy server, increasing the rate at which the data may be provided to a user. For operation, both forward and reverse proxies typically require configuration of the user, such as configuration of the user's computing device, to properly route network traffic.

Web proxy is a third type of proxy, and may be used for a different purpose. A web proxy may be used to exchange data on behalf of a user, for example, when a user accesses a network with a web or other browser instead of or in addition to access through a VPN. In a typical implementation, a web proxy acts as an intermediary at an application level between a user and a destination, application or other server, and is not necessarily local to either the user's computing device, such as in the case of a forward proxy, or the application or destination server, such as in the case of a reverse proxy. For example, a user may request a web proxy to provide access to an application available on a remote application or destination server. The request may be received by the web proxy server or web proxy, remote to both the user and the application server, and forwarded or otherwise provided by the web proxy to the application server. The web proxy will wait until a response to the request is received from the destination server, and subsequently provide the response to the user. In this manner, responses and requests may be provided between the user and the application by the web proxy for the duration of the session, that is the proxified session. Usually, a user may access a web proxy through a public network, for example a public TCP/IP network, and the proxy may access a requested application on behalf of the user through a same or different network.

Moreover, embodiments of the present invention further relate to proxy browsers. As described, a proxy server may be configured to provide data between a user and an application, for example between a user's computing device and an application on an application or destination server, wherein operations of the application may be executed by the user. However, in some instances, it may desirable to execute operations of an application at a proxy server instead of on the user's computing device. That is, instead of providing requests and/or responses between an application on an application or destination server and a user's computing device, the proxy server may generate requests and receive responses itself. With respect to a web proxy, the proxy server may emulate operations that would normally occur at a user's computing device, and accordingly for applications may for example emulate the operations using an instance of a browser on the user's computing device. To maintain a proxified session between the user and the application, the user may receive on its computing device content indicative of the execution at the proxy server of the application on the destination server. In return, the user may provide user actions to the proxy server, allowing the user to control the instance of the browser on the proxy server, that is the proxy browser, and as a result the execution of the application. In an example implementation, a user may communicate with a proxy server using a browser on the user's computing device and within a window of the browser be provided with content, for example window content, illustrating the application on the application server executing in an instance of a browser at the proxy server. A user may interact with the application by providing one or more user actions on the user's computing device, for example mouse clicks, that may be provided or communicated to the proxy server, and the proxy server may execute the user actions on the application hosted by the application or destination server. Providing a proxified session with a proxy browser is a particularly advantageous approach for use with computing devices such as mobile devices, which may have relatively limited processing capabilities and/or operate on platforms with limited application compatibility.

FIG. 1 illustrates a computer networking environment or system 100 according to an embodiment of the invention. Each of the plurality of users 102 may include a computing device, which computing devices may include but are not limited to a modem, a router, a gateway, a server, a thin client, a laptop, a desktop, a computer, a tablet, a media device, a smart phone, cellular phone or other mobile device, or any combination or sub-combination of the same. Each of the plurality of user computing devices 102 may include a memory (not shown in FIG. 1) encoded with executable instructions that may operate in conjunction with one or more processing units (not shown in FIG. 1) of the user computing device 102 to provide functionality allowing execution of a browser 103 on the respective user computing device. Each browser 103 may comprise a web browser, and may for instance be configured to execute code of a web page and/or application. Each browser 103 may comprise any browser known in the art, now or in the future, and may be executed in any operating environment or system. In one embodiment, one or more of the browsers 103 may be compliant with the Hypertext Markup Language (HTML) 5 protocol.

Each of the users 102 may be configured to communicate over a network 110 with any number of devices, including but not limited to the other components of the computer networking environment 100 described below. The network 110 may comprise one or more networks, such as local area networks (LANs), wide area networks (WANs), metropolitan area networks (MANs), cellular networks, and/or the Internet. Communications provided to, from, and within the network 110 may wired and/or wireless, and further may be provided by any networking devices known in the art, now or in the future. Devices communicating over the network 110 may communicate with any communication protocol, including TCP/IP, UDP, RS-232, and IEEE 802.11.

Each of the users 102 may communicate through the network 110 to a proxy server or proxy 120. The proxy server 120 may include one or more processing units 121 and computer readable media 123. Herein, the term computer readable media is used to refer to a single computer readable medium in some embodiments, and in other embodiments multiple computer readable media in communication with one or more processing units, such as the processing units 121. The computer readable media 123 may store executable instructions for a single sign-on (SSO) module 124, executable instructions for a selective application proxification (SAP) engine 125, executable instructions for an administrative or admin portal 126, and executable instructions for a user portal 127. The computer readable media 123 may also include a storage 128. The executable instructions for a SSO module 124 may include instructions for authenticating a user 102 to one or more applications, further examples of which are provided below. The executable instructions for a SAP engine 125 may include instructions for selectively proxifying an application, further examples of which are provided below. The executable instructions for an admin portal 126 may include instructions for allowing an administrator to configure the SSO module 124, SAP engine 125, and user portal 127, further examples of which are provided below. The executable instructions for the user portal 127 may include instructions for providing a user 102 with a webpage including an application selection interface, further examples of which are provided below. Although the executable instructions for the SSO module 124, the executable instructions for the SAP engine 125, the executable instructions for the admin portal 126, and the executable instructions for the user portal 127 are shown on a same computer readable media 123, in some embodiments any or all sets of instructions may be provided on multiple computer readable media and may not be resident on the same media. Accordingly, computer readable media 123 as used herein includes one or more computer readable media 123. Computer readable media 123 and/or storage 128 may include any form of computer readable storage or computer readable memory, transitory or non-transitory, including but not limited to externally or internally attached hard disk drives, solid-state storage (such as NAND flash or NOR flash media), tiered storage solutions, storage area networks, network attached storage, and/or optical storage.

As described, the instructions stored on the computer readable media 123 may be executed on the one or more processing units 121 or other processing units. The executable instructions for a single sign-on (SSO) module 124 may be referred to as a "SSO module" herein, where the SSO module refers to the executable instructions for a single sign-on module 124 executed by the one or more of the processing units 121 or other processing units. The executable instructions for a selective application proxification engine 125 may be referred to as a "SAP engine" herein, where the SAP engine refers to the executable instructions for a selective application proxification engine 125 executed by the one or more of the processing units 121 or other processing units. The executable instructions for an admin portal 126 may be referred to as an "admin portal" herein, where the admin portal refers to the executable instructions for an admin portal 126 executed by the one or more of the processing units 121 or other processing units. The executable instructions for a user portal 127 may be referred to as an "user portal" herein, where the admin portal refers to the executable instructions for an user portal 127 executed by the one or more of the processing units 121 or other processing units.

Each of a plurality of application or destination servers 150 may comprise an application server configured to provide a user 102 with access to one or more applications stored on such servers 150. In some embodiments, for example, an application server 150 may be configured to stream, transmit, or otherwise provide application data to a user 102 such that the user's computing device 102 and an application server 150 may establish a session, for example a proxified session, in which the user 102 may utilize on its computing device a particular application hosted on the application server 150.

Any of the application servers 150 may require that a user 102 be authenticated before access to a particular application is permitted, and a user 102 may be authenticated by an application server, for instance, responsive to receipt of valid user credentials relating to the user 102. As will be explained in more detail below, user credentials authenticating a user 102 to an application server may be provided by a user 102, or may be provided by another device, such as the proxy server 120. Each application server 150 may be configured to provide respective accesses of a same application to multiple users 102, provide a same user 102 access to multiple applications in respective sessions, and/or any combination of the foregoing.

A plurality of Internet Content Adaptation Protocol (ICAP) servers 154 may also be in communication with the proxy server 120 over the network 110. As known, one or more of the ICAP servers 154 may reduce consumption of resources of another server, such as the proxy server 120, by separately performing operations such as content filtering, compression, and virus and malware scanning In particular, the ICAP servers 154 may perform operations on content exchanged between users 102 and the proxy server 120 and the proxy server 120 and application servers 150, respectively.

One or more of the application servers 150 and/or the ICAP servers 154 may communicate with the proxy server 120 and/or one or more users 102 over the network 110. In other embodiments, the proxy server 120 may communicate with the application servers 150 and/or ICAP servers 154 using other methodologies, such as serial bus communication or a local interface.

Figure 2:
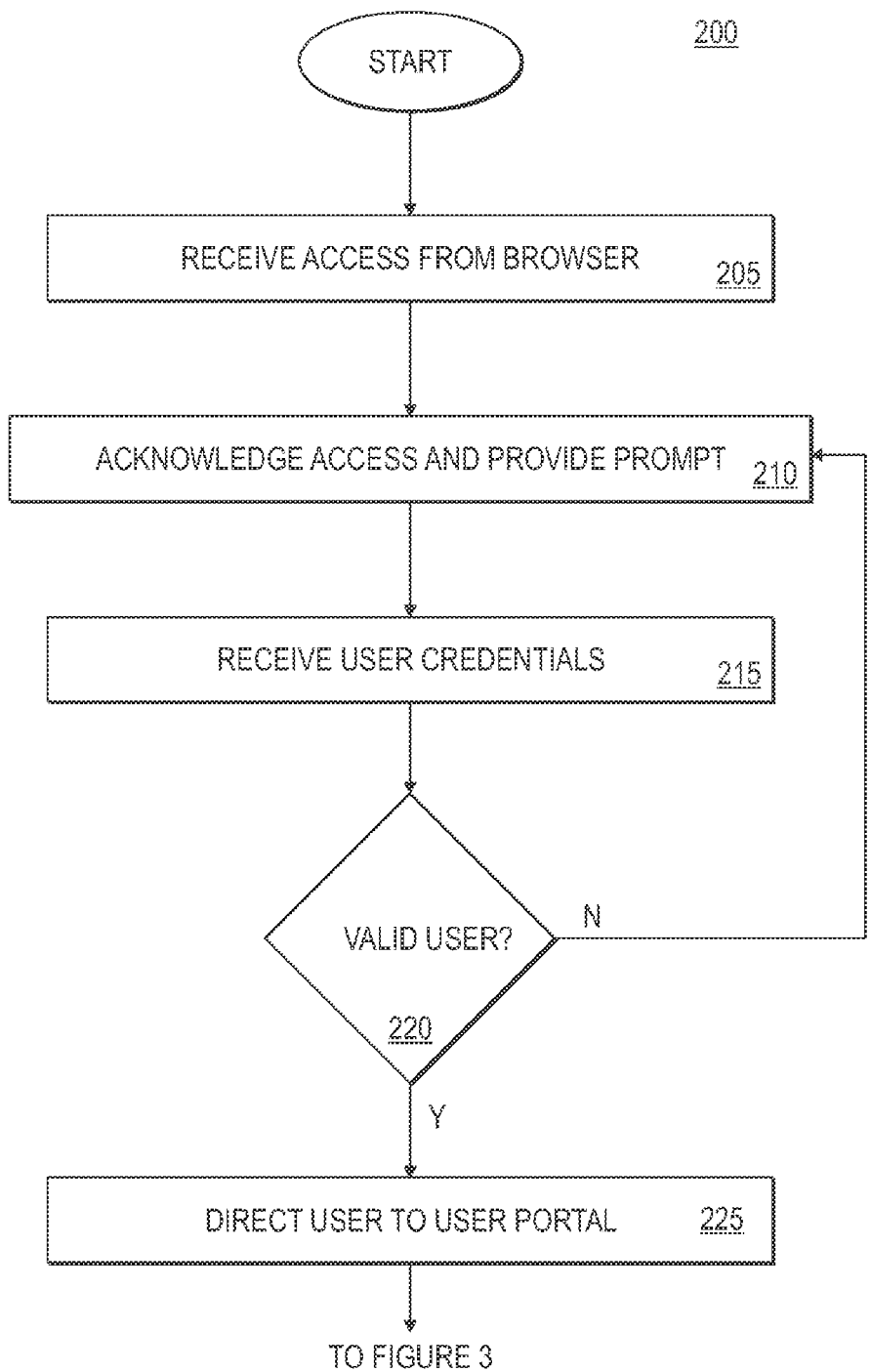
FIG. 2 illustrates a schematic flow chart of a method for a Single Sign-On authorization of a user in accordance with an embodiment of the invention.

A schematic flowchart of a method 200 for a single sign-on authorization of a user 102 according to an embodiment of a method of the present invention is shown in FIG. 2. The method 200 may, for example, be utilized by the proxy server 120 of FIG. 1, and in particular by the SSO module of the proxy server 120. At a method step 205, a request from a user 102 may be received at the SSO module. The request may comprise a hypertext transport protocol (HTTP) request and may be provided over the network 110 from a browser 103 of the user 102.

At a method step 210, the SSO module may acknowledge receipt of the request by providing a response to the browser 103. After performing any desired redirect of the browser 103, for example to consolidate hits for search engine rankings, the SSO module may request that the user 102 provide user credentials. In one embodiment, the SSO module of the proxy server 120 may request or allow the user 102 to provide user credentials by directing the browser 103 to a web page comprising one or more fields configured to receive user credentials. The user credentials may include a user name, a password, an authentication key or code, an identification number of the user's computing device or any combination of the foregoing. Once the user 102 has entered the user credentials, the user credentials may be provided to the SSO module. In at least one embodiment, the user credentials may be encrypted when provided over the network 110 to the SSO module of the proxy server 120 using, for example, symmetric and/or asymmetric encryption.

At a method step 215, the SSO module may receive the user credentials. If the user credentials are encrypted, the SSO module may perform any necessary decryption to recover the unencrypted user credentials. The SSO module may then compare the received credentials to stored credentials at a method step 220. With reference to FIG. 1, the stored credentials may be stored, for instance, in the storage 128 and/or may be stored in any other component of the proxy server 120. In other embodiments, the credentials may be stored in a device external to the proxy server 120, such as an ICAP server 154 or other server, or a remote database (not shown). In comparing the user credentials, the SSO module may, for example, retrieve stored credentials corresponding to the user name received from the user 102 and compare the stored credentials to the received credentials.

If the comparison determines that the user 102 has not provided valid user credentials, the SSO module may return the browser 103 of the user 102 to the web page comprising the one or more fields configured to receive credentials, as described above with respect to the method step 210. In some embodiments, if a user 102 provides invalid credentials a particular number of times, the SSO module may be reject further authentication requests from the host 102, for example, for a predetermined period of time or until an administrator indicates that subsequent authentication requests by the user 102 are permitted. In other embodiments, in lieu of or in addition to rejecting further attempts, the SSO module may require additional credentials to allow further authentication requests of the user 102. For example, if a user 102 provides an invalid name and password combination in three consecutive attempts, the SSO module may either reject further authentication attempts or may require that the user 102 provide an identification key in addition to the user name and password for authentication.

At a method step 225, the SSO module will have determined that the user 102 has provided valid user credentials. The user 102, therefore, will have been authenticated using single sign-on authentication. Accordingly, the SSO module may direct the browser of the user to the user portal, which may comprise a user-specific application selection interface. That is, the user portal may comprise a web page associated with the user credentials received from the user 102. In at least one embodiment, the web page may include one or more uniform resource locators (URLs), wherein each URL corresponds to an application for which the user 102 may be authenticated by the proxy server 120 as a result of the SSO authentication.

Each of the URLs may correspond to a non-proxified or a proxified application that may reside on one or more of the application servers 150. Whether an application is proxified or non-proxified may be based on a user credential basis, or may be based on the application itself. For example, authenticating with a first set of user credentials may cause an application to be proxified and authenticating with a second set of user credentials may cause the same application to be non-proxified. Alternatively, an application may be proxified for a user 102 authenticating with any user credentials, or may be non-proxified for a user 102 authenticating with any user credentials. Other schemes or methods may be utilized to determine whether or not a particular application must be proxified for a user 102.

While the foregoing has described authentication occurring between the user 102 and the SSO module of the proxy server 120, in some embodiments, authentication may occur by other methodologies. One or more network devices (not shown), for example, may authenticate the user 102 to the proxy server 120 on behalf of the user 102. It will be appreciated that any known method of authentication may be used, including, but not limited to HTTP, HTTPS, SAML, OAuth, OpenID, SSL, HTML, and XML.

Figure 3:
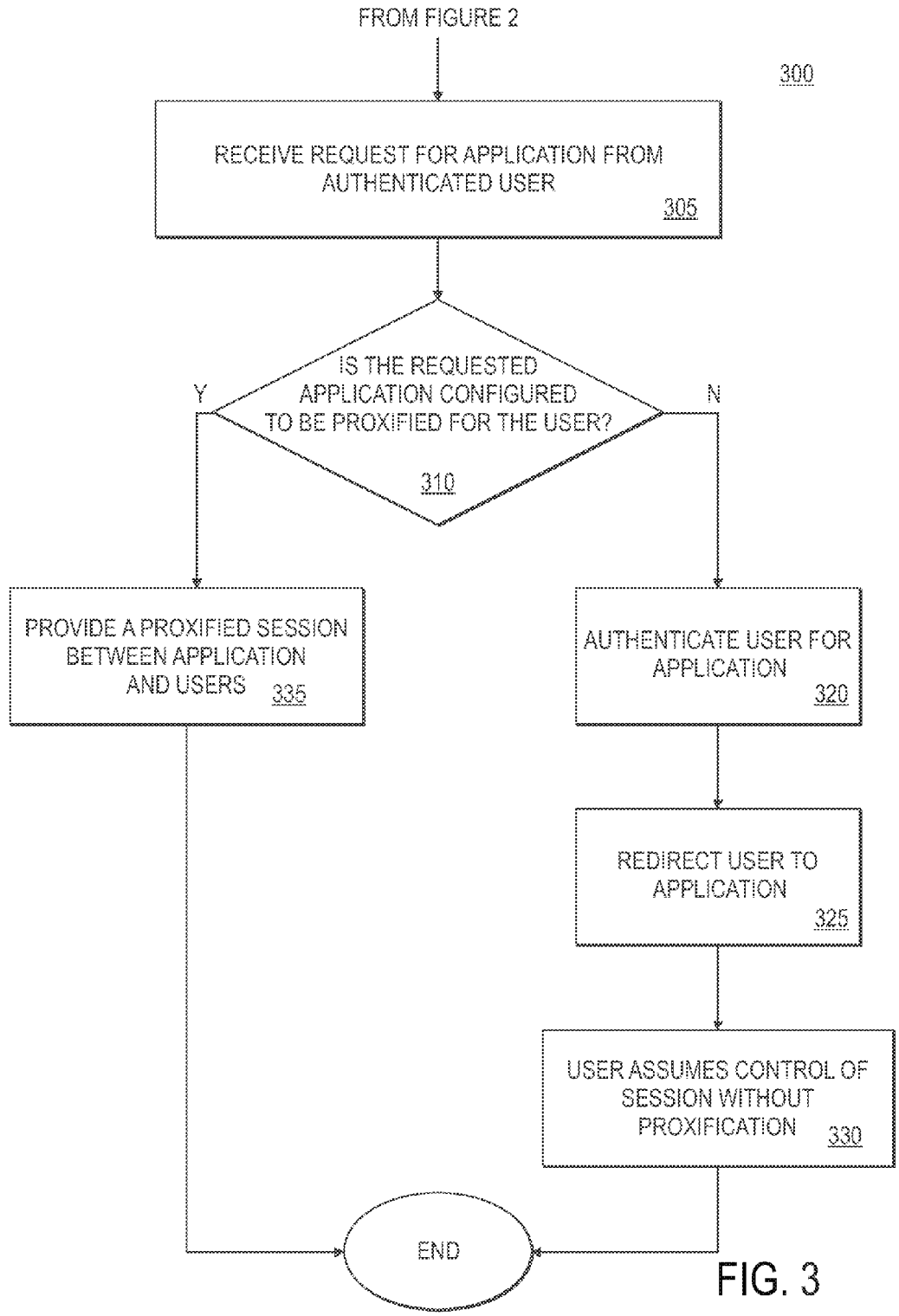
FIG. 3 illustrates a schematic flow chart of a method for providing a user access to an application in accordance with an embodiment of the invention.

A schematic flowchart of a method 300 for providing a user access to an application in accordance with an embodiment of a method of the present invention is shown in FIG. 3. As described with the method step 225 of FIG. 2, once authenticated, a browser 103 of a user 102 may be directed to a user portal, where a user 102 may provided with a plurality of URLs that may each correspond to an application for which the user 102 may be authenticated due to a successful SSO authentication. Accordingly, at a method step 305, the user 102 may select one of the applications by selecting a corresponding URL on the web page provided at the user portal. As will be described in more detail below, each of the URLs may be formatted such that the request for an application is provided to the SAP engine of the proxy server 120. In at least one embodiment, the request itself may indicate to the SAP engine which application was selected by the user 102.

At the method step 310, the SAP engine may determine whether the user 102 has requested or selected an application that the user 102 may access only through a proxified session, or whether the user 102 has requested or selected an application that the user 102 may access without a proxified session. In one embodiment, this may be determined based on the URL selected by the user 102, while in other embodiments the SAP engine may perform a separate determination. For example, the SAP engine may look up permissions stored in storage 128 to determine the applications that the user 102 may access through only a proxified session and those that may be accessed without a proxified session.

If it is determined by the SAP engine that the user has requested or selected a non-proxified application, the SAP engine may authenticate the user to the selected application on an application server 150 at a method step 320. The SAP engine may initiate a session with the application of the non-proxified application server 150, provide credentials to the selected application on the non-proxified server 150 on behalf of the user 102, and thereby authenticate the user 102 to that particular application. As described, authentication may performed with any known protocol, including HTTP, HTTPS, SAML, OAuth, OpenID, SSL, HTML, and XML.

Once the user 102 has been authenticated to the selected application, at a method step 325, the SAP engine may direct the browser 103 of the user 102 to the application server 150 for subsequent access to the selected application. As described, because the user 102 was previously authenticated using SSO authentication, in one embodiment the user 102 need not provide any user credentials to the application. Thus, at a method step 330, the user 102 may assume control of the session with the application. In some embodiments, the SAP engine may optionally terminate the session between the user 102 the proxy server 120 and/or the session between the proxy server 120 and the application server 150. Thereafter, all network activity between the user 102 and the application may be exchanged without any proxification.

If it is determined by the SAP engine that the user 102 has selected a proxified application, that is if the application is one in which a user 102 has access only through use of a proxified session, at a method step 335 the SAP engine may establish a proxified session between the user and the application. Briefly, the SAP engine may authenticate with the selected application on behalf of the user 102, and thereafter provide a proxified session between the application and the user 102. The authentication on behalf of the user 102 may be performed using any known protocol, including HTTP, HTTPS, SAML, OAuth, OpenID, SSL, HTML, and XML. The SAP engine may proxify the session between the application and the user 102 without proxifying other network activity of the user 102. In at least one embodiment, the SAP engine may manage the proxified session, at least in part, by handling sessions, managing cookies, redirecting network connections, and/or modifying web content.

Proxified sessions between the user 102 and an application on an application server 150 may be provided in several ways. According to one embodiment of the invention, the proxy server 120 may act as a web proxy, providing requests and responses between the user 102 and the application. Specifically, in providing a web proxified session, the SAP engine may parse and/or modify code in responses provided by the application. For example, after authenticating with an application on behalf of a user 102, the application on the application server 150 may provide a response including a web page that the SAP engine may provide to the user 102. However, before providing the web page to the user 102, the SAP engine may parse and/or modify the code of the web page such that any requests resulting from use of the web page will result in requests being provided to the SAP engine instead of to the application. As an example, a URL comprising cnn.com/us/ may be modified to a URL comprising sampleproxy.com/proxifier/app1?cnn/com_us, wherein "sampleproxy.com" comprises the domain of the proxy server 120. Accordingly, in executing the URL, the request may be provided to the SAP engine of the proxy server 120.

The SAP engine may subsequently recover the original request from the request received from the user 102. That is, with respect to the aforementioned example, the SAP engine may receive the URL request for sampleproxy.com/proxifier/app1?cnn.com_us and subsequently generate a request comprising cnn.com/us/. This request may be forwarded to the application, and the application may handle the request and provide a response in return.

In this manner, the SAP engine of the proxy server 102 may receive and provide requests and responses such that a proxified session may be provided between the user 102 and the application without requiring any additional configuration of the user 102 or the user's computing device. While this example has been described with respect to modification of a URL, other code, for example any code relating to markup languages such as HTML and XML, and any scripts, such as Java Script and VB Script, may be parsed and/or modified by the SAP engine to ensure that requests are sent to the SAP engine. Moreover, in some embodiments, modifications made to responses may be unique to each application and further may be unique for each user 102 and/or session. This may, for instance, ensure that concurrent sessions of multiple users 102 do not interfere with one another.

In another embodiment, the proxified session may be based at least in part on a proxy-based protocol, allowing proxified sessions to be established between a user 102 and an application. That is, the browser 103 of the user 102 may be operate in accordance with a proxy-based protocol that, for example, may be referred to as "hypertext transfer protocol with sockets with proxy" ("HTTPSP") and/or may supersede protocols such as HTTP and HTTPS. In this manner, the browser 103 may be configured to interpret a URL provided at the user portal in such a way that the browser 103 need not be configured for the application corresponding to the selected URL. Put another way, each URL provided to the user 102 at the user portal may include all information required for a browser 103 to request a proxified session with the selected application.

As an example, once a user 102 is authenticated by the proxy server 120, a browser 103 of the user 102 may be used to select a URL, for example httpsp://proxyserveraddress-?www.sampleapplication.com, provided at the user portal that relates to a proxified application, as described above. Despite that the browser 103 may not be configured to proxify communications with the selected application, the browser 103 may be configured to use a protocol relating to the selected URL. In selecting the URL, the browser 103 may be redirected to the proxy server 120, and may provide a HTTP or other request to the proxy server 120. The request may indicate to the proxy server 120 which application with which to match the user 102. In some embodiments, the URL may cause the browser 103 to request a proxified session at a particular IP address, domain name, path, and/or port of the proxy server 120. This may, for example, allow a browser 103 to access an application through a proxified session and access the application directly simultaneously.

In some embodiments, use of a proxy-based protocol may require updating the user's browser 103 such that the browser 103 is configured to operate in accordance with the proxy-based protocol. This update may be done, for instance, by installing a plug-in, extension, and/or an add-on to the browser 103. That is, a plug-in, extension, add-on, or any combination thereof may be used to alter the manner in which the proxy-based protocol operates. In other embodiments, the browser 103 may support the proxy-based protocol natively.

In yet another embodiment, the proxy server 120 may provide a proxified session between a user 102 and an application through use of one or more instances of a proxy browser executing on the proxy server 120. In some embodiments, the proxy browser may be included in the SAP engine of the proxy server 120, or may be included in other components of the proxy server 120. A user 102 may, for example, control an instance of the proxy browser, and in this manner, may utilize a selected application executing on the proxy server 120.

Figure 4:
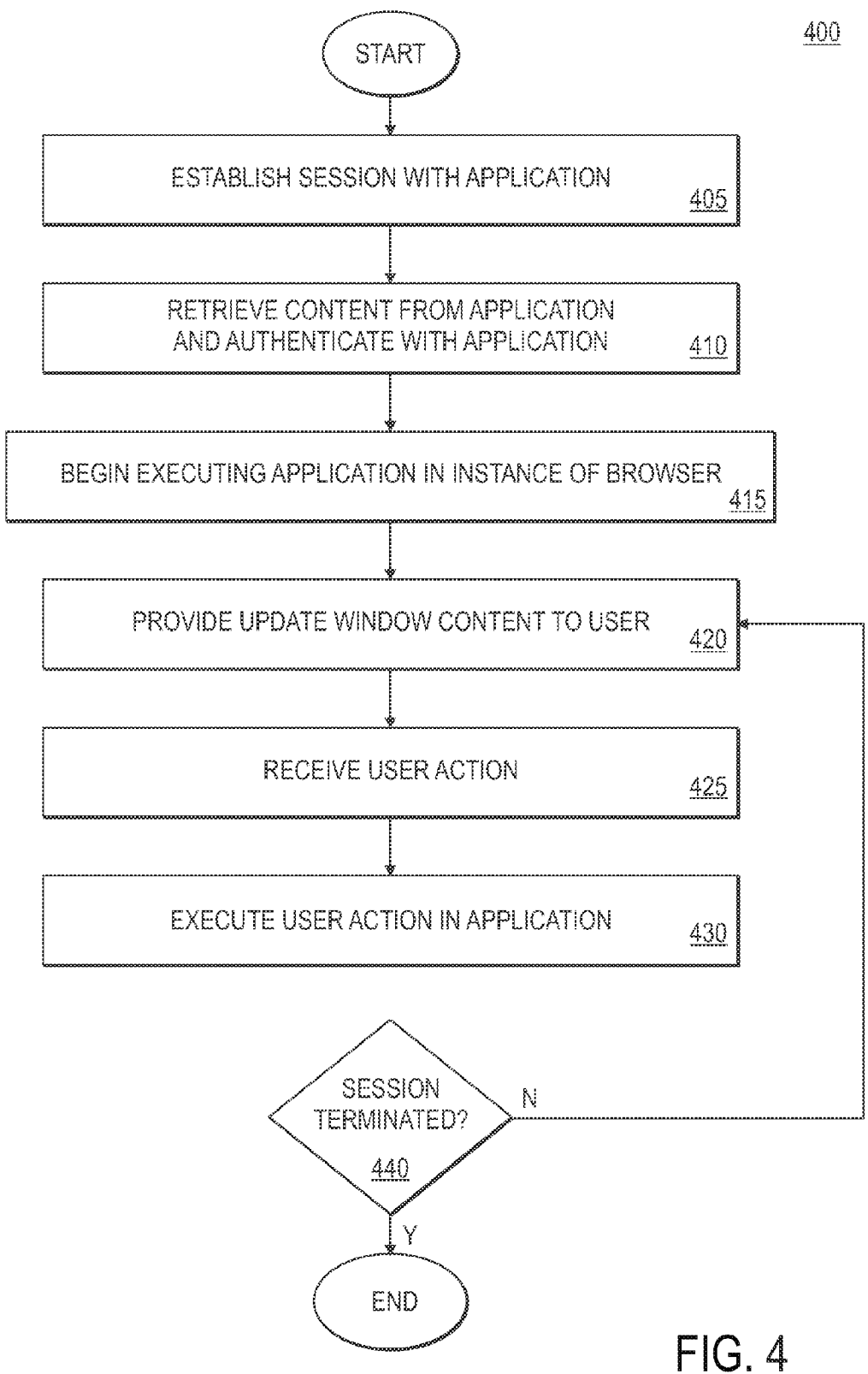
FIG. 4 illustrates a schematic flow chart of a method for providing a proxified session between a user and an application in accordance with an embodiment of the invention.

In this regard, FIG. 4 illustrates a schematic flow chart of a method 400 for providing a proxified session between a user and an application in accordance with an embodiment of the invention. The method 400 may, for instance, be used to implement the method step 335 of FIG. 3. At a method step 405, the proxy server 120 may establish a session with an application on an application server 150. Once a session has been established, at a method step 410, the proxy server 120 may authenticate with the application using credentials relating to the user 102.

Once authenticated, the proxy server 120 may begin executing the application in an instance of a browser at a method step 415. Responsive to executing the application, at a method step 420, content of the browser may be sent to the user 102. The proxy browser may, for instance, provide content to the browser 103 of the user 102 using the HTML 5 canvas element. That is, content provided to the user 102 may graphically illustrate, on a "canvas" in the browser 103, the execution of the application on the proxy server 120. At a method step 425, the proxy server may receive a user action from the user 102. User actions may comprise any action that may be made on the canvas of the browser 103 of the user 102, such as a click, key press, drag, drop, and/or may comprise other actions as well. Responsive to receipt of the user action, the proxy server 120 may emulate the user action in the application at the method step 430. In one embodiment, the user action may be provided to the proxy server with one or more sets of coordinates that may be used to indicate to the proxy server 120 the relative location of the user action on the canvas of the browser 103.

If the user action results in termination of the session between the proxy server 120 and the application, for example the browser is closed, at the method step 440 the session between the user 102 and the proxy server 120 may be terminated. If the user action that was executed at method step 430 did not result in termination, the proxy server 120 may continue to execute the application and update the canvas of the browser 103 at the method step 420. When a user action is once again received at the method step 425, this user action may be executed at the method step 430 as described above. This process may be iteratively repeated until the session is terminated at the method step 440.

In some embodiments, user actions received at method step 425 may comprise requests to download and/or upload files between the user 102 and the application. Accordingly, when these user actions are executed at method step 430, the proxy server 120 may forward file messages accordingly. That is, when the user 102 requests a download, the proxy browser executing on the proxy server 120 may forward the file message to the canvas of the browser 103 so that the canvas performs a request for the file download, allowing the user 102 to download the file. When the user 102 requests a download, a file message is provided to the proxy browser, which requests an upload to the application in turn. In some embodiments, if desired, downloads and uploads performed in this manner may be configured to pass outside of the proxy server 120, thereby reducing the activity routed through the proxified session.

Accordingly, methods and systems have been disclosed herein, describing accesses to various applications by users 102 that may be selectively proxified. More specifically, users 102 may be authorized with SSO authentication at a proxy server 120 and subsequently provided to one or more of a plurality of applications on application servers 150. In providing the applications, only those applications that have been categorized as proxified are provided to the user 102 over proxified sessions, while non-proxified applications are provided to the user without proxification. Because only some applications are proxified, the total bandwidth used in implementing a proxy server 120 may be less than, for instance, a proxy acting as an intermediary for all network traffic of a user 102. This may also reduce the likelihood of proxifying unintended information. That is, by using selective proxification, the proxy server 120 may ignore network activity for personal purposes, for example personal e-mail, or business purposes not requiring proxification, for example booking a business trip.

Moreover, as described, embodiments of the present invention do not require a user 102 to be configured for proxification of a session between the user 102 and an application. This may reduce the amount of configuration needed at the user end, thereby reducing the costs associated with implementation and deployment of network infrastructure. Embodiments of the present invention may further reduce or eliminate the need for infrastructure and deployment with respect to VPNs as well. If a user 102 is privy to only the credentials for a SSO authentication, the user 102 may not access an application, proxified or non-proxified, without first authenticating with the SSO module. Thus, should an application be proxified, the user 102 cannot access the application without using a proxified session. Accordingly, all activity of the user with the application may be monitored as if the user was operating from an enterprise network or through a VPN. Accordingly, a VPN would not provide additional security with respect to the activity of the user 102 with the selected application.

By reducing the amount of configuration, IT administration may be simplified as well. As previously discussed, the proxy server 120 may include an admin portal. The admin portal may be configured to permit a user 102 and/or an administrator to modify several settings of the proxy server 120 such that the user 102 or the administrator may manage which applications are authorized for each user and which applications need be proxified and non-proxified for each user, and associate each user with sets of credentials for the respective authorized applications. Moreover, administrators may install plug-ins, extensions, and/or add-ons to tweak and/or improve proxification of particular applications, such as those using more advanced applications using Ajax or dynamic evaluation. Administration, then, may be done in a centralized manner at the admin portal, as users 102 need not be configured for each application, further reducing implementation costs relative to other existing approaches of providing applications to users. From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. One or more non-transitory computer readable storage media encoded with instructions executable by one or more processing units of a computing system, the instructions comprising:
   authenticating, at a proxy server, a single sign-on access for a user using received user credentials;
   receiving a request, at the proxy server, to access an application on an application server requiring authentication;
   determining, after authentication of the user based on the received user credentials, whether the application is to be accessed by the authenticated user through a proxified session or a non-proxified session;
   accessing, by a processing unit of the proxy server, the application on the application server;
   authenticating the user to the application without additional authentication input from the user; and
   providing the proxified session between the user and the application.

2. The non-transitory storage media of claim 1, wherein the instructions further comprise instructions for receiving an additional authenticated request at the proxy server to access an additional application and providing the user access to the additional application without a proxified session.

3. The non-transitory storage media of claim 1, wherein the instructions for selectively providing a proxified session include instructions for modifying a response provided by the application.

4. The non-transitory storage media of claim 1, wherein the proxified session between the user and the application is based at least in part on web proxification.

5. The non-transitory storage media of claim 1, wherein the user includes a computing device and wherein the instructions for providing a proxified session include instructions for providing requests and responses of the proxified session between the application and the proxy server, providing the user with data indicative of the session between the proxy server and the application, receiving a request from the computing device to download a file from the application, and providing a file message corresponding to the file to the computing device.

6. The non-transitory storage media of claim 1, wherein the request includes a URL indicative of the application.

7. The non-transitory storage media of claim 1, wherein the proxified session is based at least in part on a proxy-based protocol.

8. A computer hardware system comprising at least one processing unit coupled to a memory, wherein the memory is encoded with computer executable instructions that when executed cause the at least one processing unit to:
- authenticate, at a proxy server, a single sign-on access for a user using received user credentials;
- receive a request, at the proxy server, to access an application on an application server;
- determine, after authentication of the user based on the received user credentials, whether the application is to be accessed by the authenticated user through a proxified session or a non-proxified session;
- access the application on the application server;
- authenticate the user to the application without additional authentication input from the user; and
- provide the proxified session between the user and the application using web proxification.

9. The system of claim 8, wherein the instructions further cause the at least one processing unit to determine whether the request requires a proxified session.

10. The system of claim 8, wherein the instructions further cause the at least one processing unit to provide the proxified session using a plug-in, an extension an add-on, or any combination thereof.

11. The system of claim 8, wherein the proxified session includes a session between a mobile device and the application on the application server.

12. The system of claim 8, wherein the instructions to provide a proxified session further cause the at least one processing unit to modify responses provided by the application.

13. The system of claim 8, wherein the instructions further cause the at least one processing unit to provide the proxified session in accordance with a proxybased application protocol.

14. The system of claim 8, wherein the instructions to provide a proxified session include instructions to cause the at least one processing unit to execute a proxy browser.

* * * * *